United States Patent [19]

Paget

[11] 4,360,319

[45] Nov. 23, 1982

[54] COMPRESSOR

[76] Inventor: Win Paget, P.O. Box 1335, Elizabethtown, N.C. 28337

[21] Appl. No.: 177,609

[22] Filed: Aug. 13, 1980

[51] Int. Cl.³ .................. F04B 21/04; F04B 39/10; F16K 15/14
[52] U.S. Cl. .................................. 417/238; 417/571; 137/512.15; 137/514; 137/516.19
[58] Field of Search ............. 137/512.1, 512.15, 512.4, 137/514, 516.15, 516.17, 516.19, 516.21, 516.23, 854, 855, 856; 417/238, 571, 562, 559, 564; 92/172

[56] References Cited

U.S. PATENT DOCUMENTS

| | | | |
|---|---|---|---|
| 1,188,969 | 6/1916 | Meister | 137/512.15 |
| 1,299,761 | 4/1919 | Nelson | 417/571 X |
| 1,580,434 | 4/1926 | Holdsworth | 417/298 |
| 2,160,401 | 5/1939 | Engelman | 137/512.15 X |
| 2,417,246 | 3/1947 | Ferguson | 417/559 |
| 2,989,227 | 6/1961 | Statham | 417/238 |
| 3,319,879 | 5/1967 | Brown | 417/571 |
| 3,370,786 | 2/1968 | Brown | 417/571 |

FOREIGN PATENT DOCUMENTS 1121459 8/1956 France .................. 417/571

Primary Examiner—Carlton R. Croyle
Assistant Examiner—Edward Look
Attorney, Agent, or Firm—Young & Thompson

[57] ABSTRACT

A compressor has flat cylinder heads in which circular valves are disposed. The valves are of the type having a slotted valve seat and a slotted valve guard, with elongated valve elements disposed between the seat and the guard to open and close the slots of the valve seat. The flat circular valves are perpendicular to the piston axis and extend substantially farther from the piston axis than does the piston and so directly overlie only a portion of the piston. Therefore, the slots are provided only on the radially inner portion of the valve, the radially outer portion being imperforate. This enables the valve to be used with pistons of different diameters and under various conditions of operating pressure. Also, the cylinder liner is provided with a port at the intersection of its cylindrical inner side wall and its end wall that confronts the valve, whereby part of the clearance volume extends radially outwardly under those slots which would otherwise be masked by the liner.

11 Claims, 13 Drawing Figures

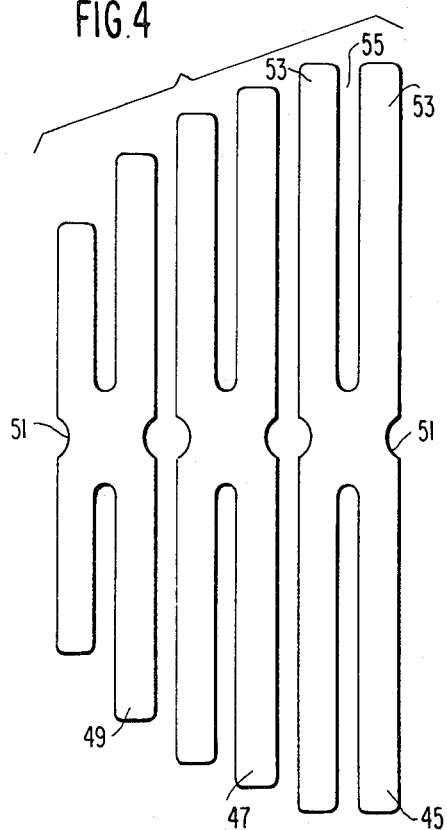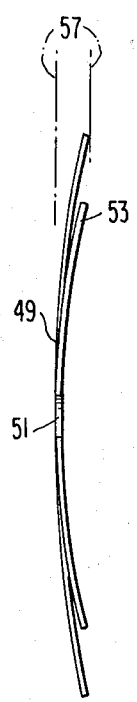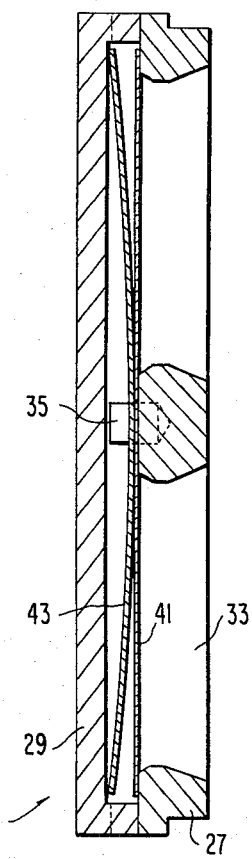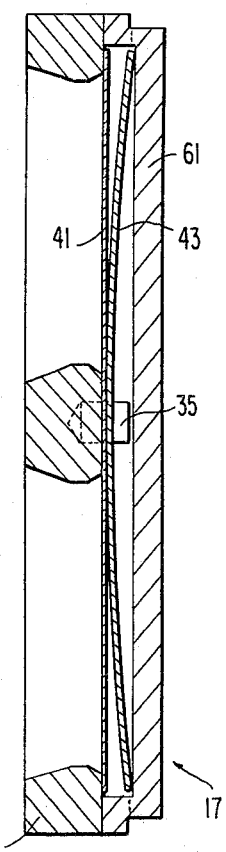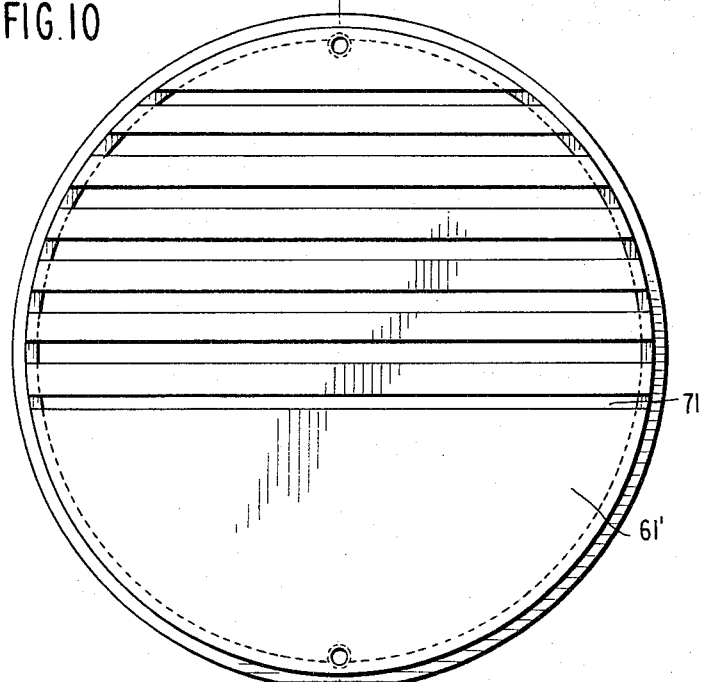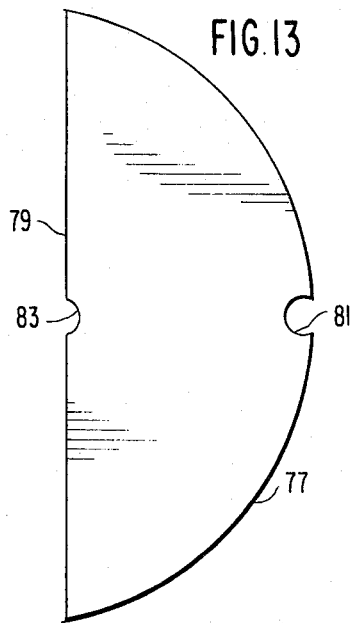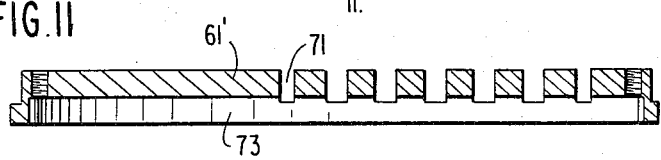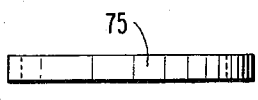

COMPRESSOR

The present invention relates to a compressor of the reciprocating piston type, more particularly of the non-lubricated air compressor type.

The present invention relates both to single-acting and to double-acting compressors but has particular utility in the case of double acting compressors and so will be described and illustrated by way of example in connection with a double acting compressor.

In the case of the inboard cylinder head of a double-acting compressor, it is desirable to have the valve assemblies separately removable without the need to remove the outer cylinder head, the cylinder, or the piston. A common construction, followed also in the present invention, is to use circular valve assemblies to fit in circular recesses machined in the cylinder head, there being at least one inlet valve position and one discharge valve position in each cylinder head.

It is also known to use cylinder heads which provide for two, three or four inlet and discharge valve assemblies; and this is a commercially attractive arrangement because it allows the use of only one size of valve assembly, rather than a different size of valve for each diameter of cylinder.

Not all the valve assemblies are used for all diameters of piston, because it is desirable to maintain the "clearance volume" as small as possible. To understand this point, and to understand what is meant by "clearance volume", it is necessary to consider the various factors involved in designing a valving system, as follows:

First, it is desirable to have the largest area through the valve that is possible, as this causes the least restriction of the airflow entering or leaving the cylinder. For rather involved dynamic reasons, the lift of a valve element must be reduced inversely as the speed of operation (that is, the rpm) is increased; and the valve must also be lighter or thinner unless the spring tension is increased, as otherwise the valve will not close promptly at top dead center of the piston and some reverse flow of discharge air back into the cylinder will occur.

The main problem, however, is caused by the "clearance volume". To prevent the piston from striking the cylinder heads at each end of its stroke, some clearance must be provided between the piston and the cylinder heads, and this is normally 1.5–2% of the piston stroke.

The so-called "clearance volume" is comprised by the space between the piston at the end of its stroke and the piston head and valve assemblies, and the volume of the ports in the discharge valve right up to the seating plane of the valve elements. With good design, the clearance volume can be kept as low as 5% of the piston displacement, but it is often 10% or even 12% in some commercial designs.

At the end of the compression stroke of the piston, all of this clearance volume will be filled with air at the discharge pressure; and as the piston starts down on the intake stroke, all of its air must be expanded back down to inlet pressure before the inlet valve can start to open. This reduces the capacity of the cylinder, which is normally expressed as the "volumetric efficiency".

Just how much the capacity is reduced is not only a function of the clearance volume, but is also dependent on the compression ratio at which the cylinder is working. If air is being compressed from atmospheric pressure to 100 pounds per square inch gage, the compression ratio is 7.8 to 1; and if the re-expansion of the clearance volume air were isothermic (which it very nearly is), the expanded air would reduce the capacity of the cylinder by 6.8 (one volume remains in the clearance space) times the clearance volume. If the clearance volume were 5%, the capacity would be reduced by 34%.

If the compressor were a two-stage unit compressing air from atmospheric pressure to 100 psig, the theoretical ratio between stages would be the square root of 7.8, or 2.79 to 1. In this case, the 5% clearance volume would expand 1.79 times 5%, or 8.95%, so that the clearance volume would be far less damaging.

The problem, however, is that in most lines of commercial compressors, the same cylinder may be the high pressure stage of a two-stage compressor, or the single cylinder of a single stage compressor, both discharging at 100 psig. Now, in addition to the re-expansion of the clearance air, the volumetric efficiency of the cylinder is affected by the resistance through the valves (which is a function of the actual "free" area through the valve under valve spring tension) plus some preheating of the inlet air as it enters the cylinder; and in good designs this can be as little as a 7% loss in capacity. Quite obviously, one must strike a balance between clearance volume and valve area, depending on the compression ratio, and also on the speed at which the compressor is to be operated.

The present invention provides a means for adapting any given diameter of cylinder to the most efficient point of operation for a range of discharge pressures, or a range of operating speeds, by changing only the valve assembly in the case of a change of pressure, or the valve assembly and the cylinder liner, in the case of a change in piston diameter.

More particularly, the present invention provides an asymmetrical valve construction, characterized by parallel slots through the valves which are opened and closed by elongated valve elements, the slots being clustered on the same side of the valve as the piston rod, the valve thus being devoid of slots on at least a portion of its side away from the piston rod.

The circular valve assemblies of the present invention will extend away from the piston rod a greater distance than the piston, to a degree which depends on the piston diameter. The present invention permits the use of pistons of various diameters, not only by the asymmetric relationship referred to above, but also by the provision of replaceable liner elements of various inside diameters corresponding to the diameter of the piston selected, these liners having, at their inner edges that confront the valve, a liner port that is recessed in the material of the liner and that underlies those slots that would otherwise be masked by the liner.

It is thus possible to change the valve's area in any given cylinder without incurring any problem arising from excessive clearance volume.

Moreover, as the valves are mounted in the cylinder head, which is a simple unit with a flat face, the piston can also be flat and its thickness may be anything that is desired. It has in fact been found possible to use the simplest type of solid piston and still keep the weight and stress levels within bounds.

It is accordingly an object of the present invention to provide a compressor in which valves of the same external size may be used which are, however, adapted for various piston diameters and/or operating pressures.

Another object of the present invention is to provide a compressor in which the clearance volume will be kept to a minimum.

Finally, it is an object of the present invention to provide a compressor which will be highly efficient, relatively simple and inexpensive to manufacture, easy to install, adjust, maintain and repair, and rugged and durable in use.

Other objects, features and advantages of the present invention will become apparent from a consideration of the following description, taken in connection with the accompanying drawings, in which:

FIG. 4 is an assembly plan view of a set of valve backing plates;

FIG. 5 is an edgewise view from the left of one of the plates shown in FIG. 4;

FIG. 6 is a cross-sectional view taken on the line 6—6 of FIG. 2, showing a discharge valve assembly;

FIG. 7 is a view similar to FIG. 6, but showing an inlet valve assembly;

FIG. 10 is an elevational view of the inlet valve guard of FIG. 7, that is, a right side view of FIG. 7 rotated 90 degrees about its axis;

FIG. 11 is a cross-sectional view on the line 11—11 of FIG. 10;

FIG. 12 is an edgewise view of a filler for the inlet valve guard; and

FIG. 13 is an elevational view of the filler shown in FIG. 12.

Figure 1:
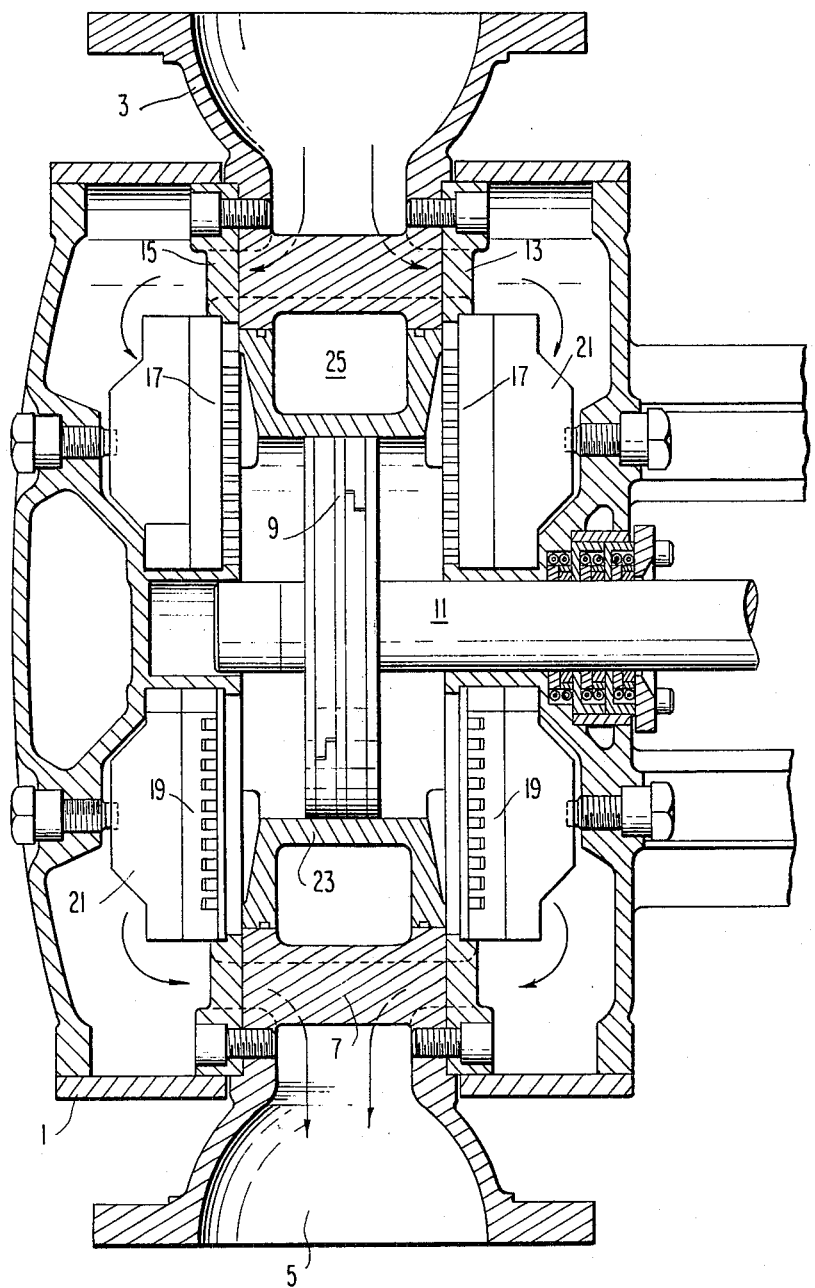
FIG. 1 is a cross-sectional view of a single stage of a compressor according to the present invention.

Referring now to the drawings in greater detail, and first to FIG. 1, there is shown a stage of a compressor according to the present invention, which may be either a single stage compressor or a multi-stage compressor. Of course, if it is a single stage compressor, then the stage shown in FIG. 1 will constitute the compressor itself. In fact, however, the stage shown in FIG. 1 is the second stage of a two-stage compressor, comprising a casing 1 having an inlet 3 which receives air under pressure from an intercooler fed by a first compressor stage (not shown), and an outlet 5. A portion of casing 1 is comprised by a cylinder 7 in which reciprocates a piston 9 driven by a piston rod 11 from a motor (not shown). Although piston 9 is shown to be a flat head piston, the invention is equally useful with pistons of other shapes, for example a truncated conical head piston.

An inboard piston head 13 and an outboard piston head 15 are secured to cylinder 7 and provide the circular seats for a plurality of inlet valves 17 and discharge valves 19. It is evident from FIG. 1 that the illustrated compressor is of the double-acting type. The valves are releasably held in place by valve cages 21. Of course, the invention is not limited to double-acting compressors.

Disposed within cylinder 7, in sealed relation therewith, is a replaceable liner 23 which, with the other portions of cylinder 7, defines a water jacket 25 through which cooling water is circulated by conventional means (not shown). Liner 23 may be of any of a variety of internal diameters, thereby selectively to adapt the compressor to operation with pistons of correspondingly various diameters.

Figure 2:
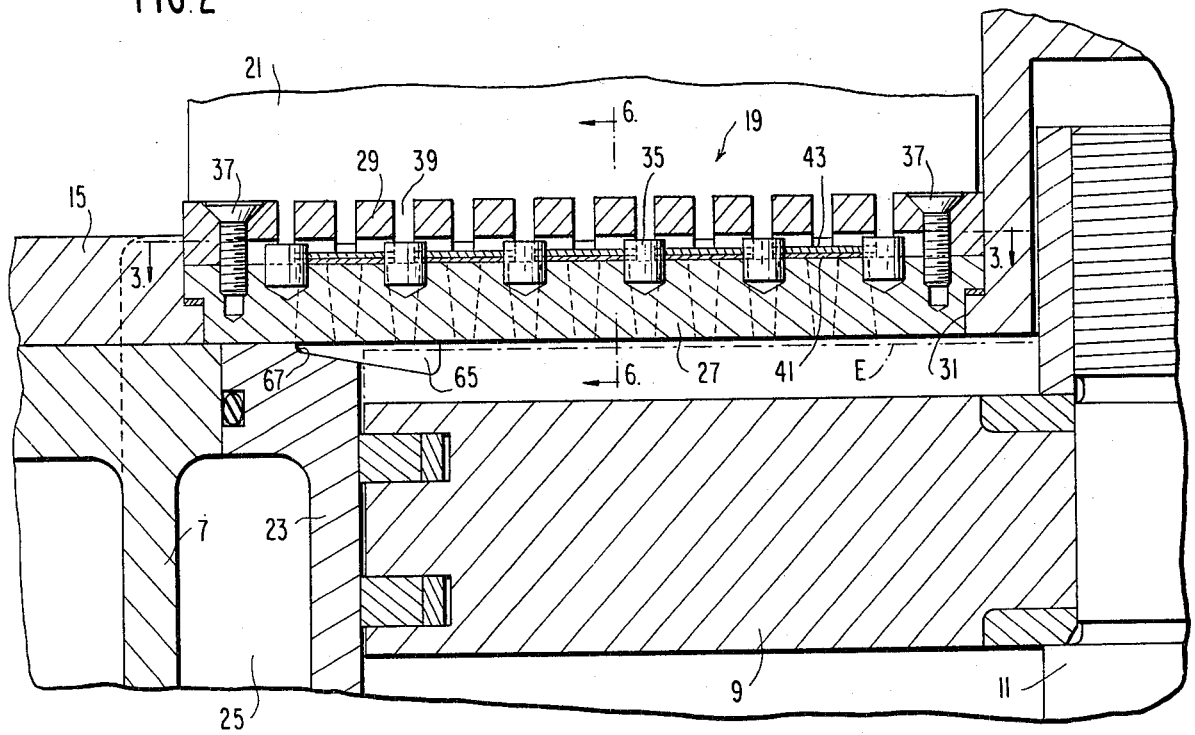
FIG. 2 is an enlarged fragment of FIG. 1, showing a first embodiment of one of the discharge valves.

Turning now to FIG. 2, there is shown in greater detail one of the discharge valves 19, it being understood that the inlet valves 17 are quite similar apart from minor differences that will be pointed out hereinafter.

Each valve 19 comprises a circular valve seat 27 and a circular valve guard 29, valve seat 27 being received, in the case of discharge valve 19, in a correspondingly shouldered recess 31 in one of the piston heads. Valve seat 27 has a plurality of slots 33 therethrough, arranged with mirror image symmetry on opposite sides of a plane A—A shown in FIG. 3, which is also the plane on which valve 19 is cut in FIG. 2. Slots 33 are of various lengths, so that their outer ends are approximately equidistant from the periphery of seat 27. Slots 33 are all parallel to each other and to a tangent to the piston at the point at which plane A—A intersects the periphery of the piston.

Cylindrical dowels 35 are also secured in and project from seat 27, along that same plane of symmetry A—A; and screws 37, disposed beyond the opposite ends of the series of dowels 35, also along plane A—A, releasably secure valve guard 29 to valve seat 27.

Slots 39 through valve guard 29 provide an outlet for air leaving discharge valve 19. Slots 39 differ from slots 33, however, in that the slots 39 are continuous across the entire chord of valve guard 29 and are offset from, that is, out of register with, the slots 33.

Thin resilient metal valve elements 41, e.g. of stainless steel, flex to open and close slots 33 and are backed up by valve backing plates 43 which are also of resilient metal, e.g. stainless steel. In their undeformed condition, valve elements 41 are flat; while valve backing plates 43 in their undeformed condition are arcuate. Apart from this, elements 41 and plates 43 can and do have exactly the same size and shape and can be stamped with the same tools, which simplifies their production. Plates 43, however, will be 50 to 100% thicker than elements 41, so that elements 41 can deform during opening and closing without substantial deformation of plates 43. For example, elements 41 might have a thickness in the range of 0.010–0.025 inch; while plates 43 might have a thickness in the range 0.030–0.040 inch. In order to maintain the spring characteristics of members 41 and 43 substantially constant regardless of their length, they are of a thickness which varies directly as their length.

Figure 3:
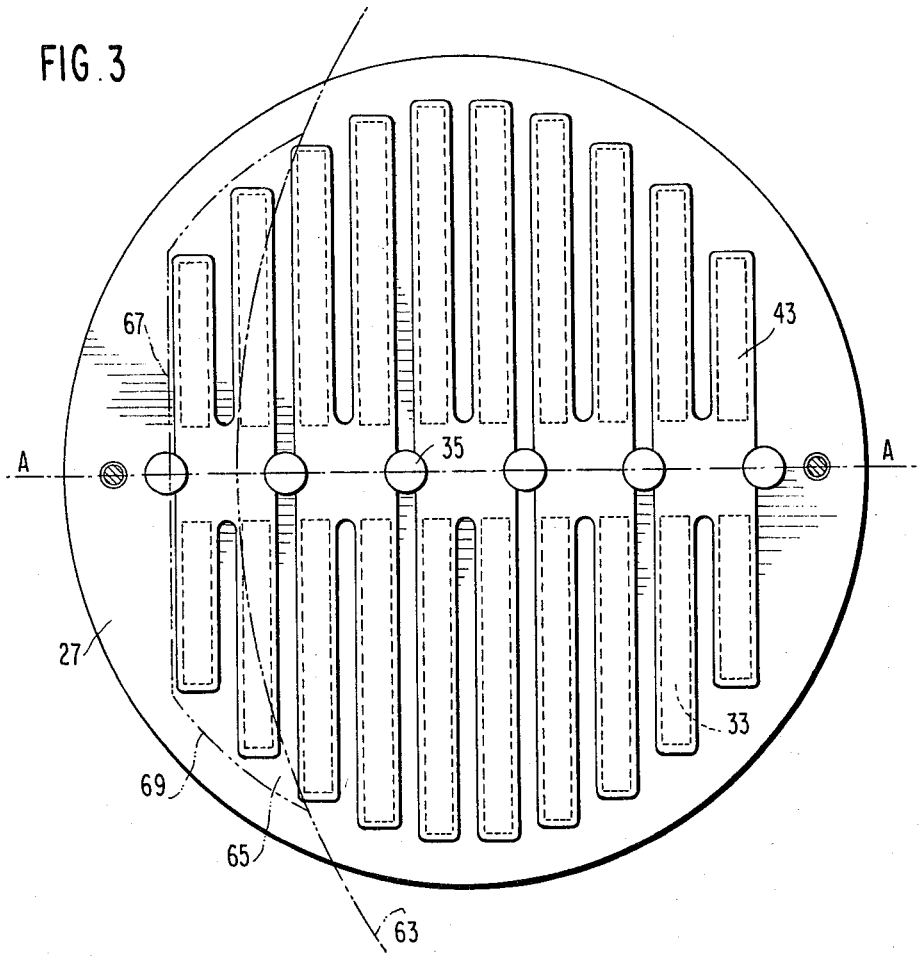
FIG. 3 is a cross-sectional view of a discharge valve seat and associated valve and backing members, taken on the line 3—3 of FIG. 2.

As will be seen from FIG. 3, the plates 43, and hence the elements 41, are slightly wider and longer than the slots 33 they overlie, so that the elements 41 will completely close the slots during the suction stroke.

As the size and shape of elements 41 and plates 43 are the same, apart from the curvature of plates 43, it will suffice to discuss in detail the plates 43, which are best seen in FIGS. 4 and 5. As is shown in FIG. 4, the plates 43 (and hence of course the elements 41) are provided in a plurality of different sizes and shapes, depending on their position in the valve, those occupying the central position being indicated at 45, and the progressively outer ones at 47 and 49, respectively. Notice that each plate 43 is symmetrical about the plane A—A and has, on its opposite edges in that plane, two opposed recesses 51 of a size and shape just to receive dowels 35. Dowels 35 thus perform an exact locator function for plates 43 and elements 41. In operation, there is no relative movement between those members and dowels 35 at their points of contact.

Each dowel 35 intermediate the ends of the line of dowels 35, performs double duty: on one side it positions one pair of members 41 and 43; while on its other side, it positions the immediately adjacent pair of members 41 and 43.

Each plate 43 (and element 41) also has two pairs of parallel fingers 53 spaced apart by slots 55. In central plate 45, the fingers 53 are all of the same length; while in the progressively outer plates 47 and 49, the fingers are of different lengths, the radially outermost corners of the fingers thus together describing a circle concentric with the associated valve 19.

Turning now to FIG. 5, which is an edgewise view from the left of plate 49, the configuration of the plates 43 will be particularly noted. Notice that the fingers 53, although of different lengths, nevertheless are all bent the same distance out of the plane of the central portion. In other words, as seen in FIG. 5, the two planes indicated by the arrows in FIG. 5, one of which contains the central portion of the plates 43 and the other of which contains the ends of all the fingers 53, are parallel to each other. This ensures that all of the fingers 53 will exert substantially equal spring force.

The shape of plates 43, indicated by FIG. 5, is achieved by a known process, namely, by fixedly securing the central portion of the plate, deflecting the ends of the fingers to a desired degree, and heating to 900°-1000° F. for one to four hours in the deformed condition to constitute the deformed plate of precipitation-hardening stainless steel as a spring. The non-circular catenary or parabolic curve thus imparted to plates 43 is highly desirable as it nicely matches the curvature of valve elements 41 upon flexure.

What is seen in FIG. 3 is thus the valve elements 41 and plates 43 assembled on valve seat 27 and exactly positioned thereon by dowels 35, with the valve guard 29 removed. The valve elements 41 are thus not visible in FIG. 3, because they exactly underlie the plates 43.

Instead, to see more easily the assembled position of the parts, reference should be had to FIG. 6, which in effect is FIG. 3 with the valve guard 29 added. In that assembled position of the parts, valve element 41 is flat and so is unstressed, because it was flat to begin with. However, valve backing plate 43 is somewhat deformed from its curved condition shown in FIG. 7, and specifically is somewhat flattened, because the distance between valve seat 27 and the confronting surface of valve guard 29 is less than the distance between planes 57. The ends of fingers 53 thus bear resiliently against that underside of guard 29; while the central portions of plates 43 bear firmly against the corresponding central portions of valve elements 41.

As previously mentioned, inlet valve 17 differs only slightly from discharge valve 19. The differences are seen in FIG. 7. As will be apparent, the valve seat 59 of inlet valve 17 has a plain cylindrical outer periphery; whereas it is the valve guard 61 that is shouldered to conform to the correspondingly shouldered recess 31 in valve heads 15 and 17. Apart from this, the inlet valves are the same as the discharge valves.

As noted above, it is an important advantage of the present invention to be able to change piston diameters and/or operating pressures, with a minimum of effort and a minimum of different parts. This is illustrated with reference to FIGS. 8 and 9, in which structure is disclosed which is similar to that of FIG. 2 but enables the use of a piston 9' of smaller diameter, with a liner 23' of correspondingly smaller internal diameter. Discharge valve 19' will have exactly the same external contours, and so will be receivable in the same recess 31 in the same cylinder head 15. However, the number of slots 33 through valve 19' will be correspondingly reduced; and to effect this reduction, discharge valve 19' is given a very unique asymmetric configuration.

Figure 9:
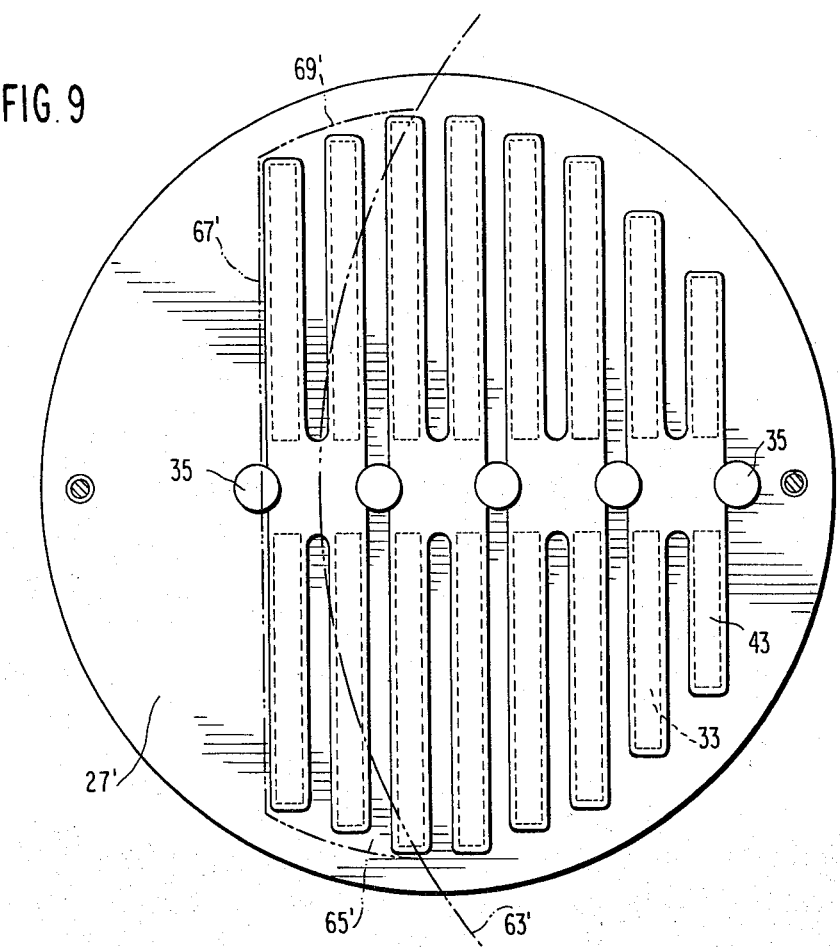
FIG. 9 is a view similar to FIG. 3, but taken on the line 9—9 of FIG. 8.
Figure 8:
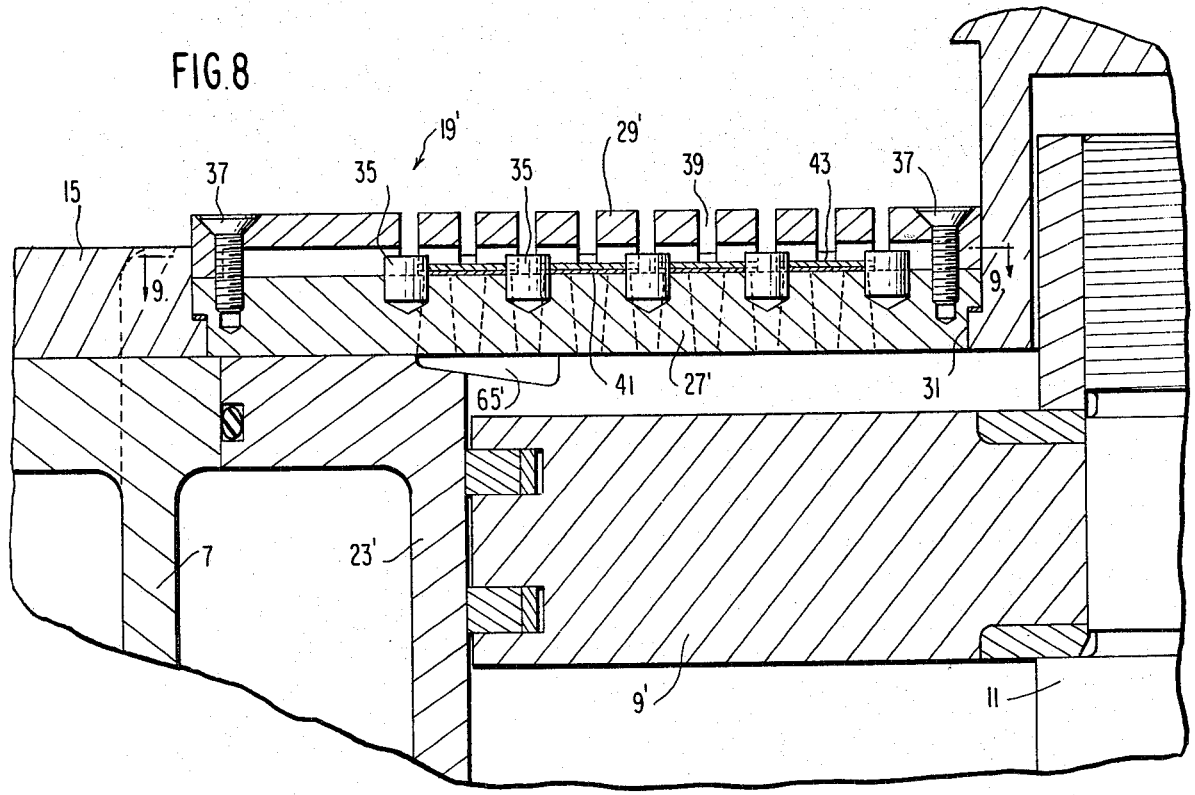
FIG. 8 is a view similar to FIG. 2, but showing a second embodiment of valve according to the present invention.

Specifically, the slots 33, with their corresponding valve element 41 and backing plate 43 of the shape of plate 49 in FIG. 4, are eliminated from the left side of FIGS. 8 and 9, which is the radially outer side of valve 19' relative to the axis of piston 9'. The asymmetric configuration thus imparted to valve seat 27' is matched by the asymmetric configuration imparted to valve guard 29', in which there are correspondingly fewer slots 39, the dowels 35 also being of lesser number.

There is thus provided what amounts to a smaller valve, while at the same time requiring no change in the cylinder head that receives it or the valve cage that retains it.

Comparison of FIGS. 2 and 8 will make it plain that the invention is well adapted for use with valves of constant diameter but with pistons of various diameters, and that accordingly the valves will directly overlie the various pistons only to varying extents. In other words, in FIG. 2, a much larger proportion of the area of valve 19 overlies piston 9 than the proportion of the area of valve 19' that overlies piston 9' in FIG. 8. This is best seen by comparison of FIGS. 3 and 9. In FIG. 3, the imaginary line 63 indicates the periphery of piston 9; while in FIG. 9, the imaginary line 63' indicates the periphery of piston 9' (or, correspondingly, the inner peripheries of liners 23 and 23', respectively). Needless to point out, the radius of curvature of line 63 is substantially greater than that of line 63'.

As will also be evident from FIGS. 3 and 9, there is no way in which all of slots 33 can be disposed within lines 63 and 63', without eliminating some of those slots. In other words, there is no way to preserve both a desirably large diameter for the valves, and also to have them directly overlie their respective pistons; and this is particularly true in the embodiment of FIGS. 8 and 9.

Therefore, the present invention provides another important and unique feature, in the form of liner ports 65 and 65', that are cast into the metal of the respective liners 23 and 23'. The liner ports are each of generally crescent shape and are bounded inwardly by the inner side wall of the liner and radially outwardly by a straight margin 67, 67' which at its ends merges into circular marginal sections 69, 69' the floor of the liner port 65, 65' being inclined downwardly in a radially inward direction. The ends of each port 65, 65' corresponding to the tips of the crescent, are of a vertical height greater than that of the midsection of the port on plane A—A.

As will also be evident from FIGS. 3 and 9, the ports 65 and 65' thus fully underlie the slots 33 that would otherwise be out of registry with their associated piston.

By providing the liner ports 65, 65' by a simple casting operating during the formation of the corresponding liner 23, 23' it is thus possible to match the valve exactly to any desired size of piston, with a minimum increase in the clearance volume that was described above. The end position of the piston is shown in phantom line at E in FIG. 2, from which it will be evident that the clearance volume of the compressor according to the present invention has been kept to a minimum.

It will of course be appreciated that the valve port-liner port relationship described above applies also to existing valves of the strip type when modified so as to display the asymmetric arrangement of the present invention.

The valve guard 61 for inlet valve 17 is shown in greater detail in FIGS. 10-13. As will there be seen, it has a plurality of through slots 71 extending chordally substantially its full diameter, which slots can be the same as slots 39. However, the inlet valve shown in FIGS. 10-13 is for use with a piston of relatively small diameter, and so requires an asymmetric configuration like that of FIGS. 8 and 9. Specifically, the slots 71 are displaced to one side of valve guard 61'.

An important modification of the valve guard for the inlet valves (but not for the discharge valves), in the case of such an asymmetric configuration, is also illustrated in FIGS. 10-13. Namely, in the case of an asymmetric inlet valve, there tends to be a dead space indicated at 73 in FIG. 11, which is not opposed by any slot 71. This dead space 73 constitutes an addition to the clearance volume described above. This dead space 73 of course results from the machining of the shallow cylindrical cavity within valve guard 61', that is necessary for the proper positioning of plates 43 in their assembled compressed relationship.

According to the present invention, this dead space 73 is filled with a filler 75 whose one edge 77 is part circular and whose other edge 79 is a straight chord of that circle, the sagitta of the arc thus produced being sufficiently great to position edge 79 suitably close to the outermost slot 71. Edge 77 has a recess 81 therein for the reception of the associated screw 37; while edge 79 has a recess 83 therein for the reception of the associated dowel 35.

It is preferred that filler 75 be secured to valve guard 61' by soldering or the like.

It is of course to be understood that dead space 73 could be filled by other means, for example by machining out all but the material represented by filler 75. However, such a machining operation would be complicated, time-consuming and expensive; and the use of a separate filler 75 is accordingly greatly to be preferred.

From a consideration of the foregoing disclosure, therefore, it will be evident that all of the initially recited objects of the invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A compressor having a cylinder, a cylinder head closing one end of the cylinder, a piston secured to a piston rod and reciprocable in the cylinder toward and away from the cylinder head, a valve in the cylinder head, the valve being circular and disposed in a plane perpendicular to the piston rod and having its axis spaced from and parallel to the axis of the piston, the valve extending radially outwardly beyond the piston relative to the axis of the piston, the valve comprising a circular valve seat and a circular valve guard and a plurality of slots extending through the valve seat and valve guard and disposed in parallel relationship to each other perpendicular to the plane that includes said valve and piston axes and bisects said valve, and valve elements movable between said valve seat and valve guard to open and close said slots, the arrangement of said slots in said valve being asymmetric and said slots extending closer to the radially inner edge of the valve along said plane than to the radially outer edge of the valve along said plane.

2. A compressor as claimed in claim 1, the cylinder having a replaceable liner having an inner cylindrical side wall that terminates in an end wall that contacts said valve, and a port extending through said side and end walls of the liner at the intersection of said side and end walls and said plane.

3. A compressor as claimed in claim 2, said port being of generally crescent shape and directly overlying only those slots which are on the radially outer side of the valve.

4. A compressor as claimed in claim 3, the outer side of said port being straight and parallel to and closely adjacent the outermost said slot.

5. A compressor as claimed in claim 4, the port having a bottom wall opposite the valve which is inclined radially inwardly away from the valve.

6. A compressor as claimed in claim 1, said valve seat and valve guard being spaced apart from each other in the region of said slots, said valve seat and valve guard being contiguous to each other over substantially the entire region which lies immediately outwardly beyond the slot which is farthest from said piston axis.

7. A compressor as claimed in claim 6, and a separate filler which extends between the valve seat and valve guard and fills only the space between the valve seat and valve guard that is disposed immediately outwardly beyond the slot which is farthest from said piston axis.

8. A compressor having a cylinder, a cylinder head closing one end of the cylinder, a piston secured to a piston rod and reciprocable in the cylinder toward and away from the cylinder head, a valve in the cylinder head, the valve being circular and disposed in a plane perpendicular to the piston rod and having its axis spaced from and parallel to the axis of the piston, the valve extending radially outwardly beyond the piston relative to the axis of the piston, the valve comprising a circular valve seat and a circular valve guard and a plurality of slots extending through the valve seat and valve guard and disposed in parallel relationship to each other and being perpendicular to the plane that includes said valve and piston axes and bisects said valve, and valve elements movable between said valve seat and valve guard to open and close said slots, the cylinder having a replaceable liner having an inner cylindrical side wall that terminates in an end wall that contacts said valve, and a port extending through said side and end walls of the liner at the intersection of said side and end walls and said plane, said port directly overlying only those slots which are farthest from said piston axis.

9. A compressor as claimed in claim 8, said port being of generally crescent shape.

10. A compressor as claimed in claim 9, the outer side of said port being straight and parallel to and closely adjacent said farthest slots.

11. A compressor as claimed in claim 10, the port having a bottom wall opposite the valve which is inclined radially inwardly away from the valve.

* * * * *